United States Patent [19]

Takeda

[11] Patent Number: 4,800,414

[45] Date of Patent: Jan. 24, 1989

[54] MAGNIFICATION VARYING DEVICE FOR ELECTRO-PHOTOGRAPHIC COPYING MACHINE

[75] Inventor: Katsuhiko Takeda, Okazaki, Japan

[73] Assignee: Minolta Camera Kabushiki Kaisha, Osaka, Japan

[21] Appl. No.: 19,560

[22] Filed: Feb. 27, 1987

[30] Foreign Application Priority Data

| | | | |
|---|---|---|---|
| Mar. 3, 1986 | [JP] | Japan | 61-47114 |
| Mar. 3, 1986 | [JP] | Japan | 61-47115 |
| Aug. 27, 1986 | [JP] | Japan | 61-200699 |

[51] Int. Cl.⁴ ........................ G03B 27/36; G03B 27/38

[52] U.S. Cl. ........................................ 355/58; 355/60; 355/57

[58] Field of Search ........................ 355/56, 58, 60, 55, 355/57

[56] References Cited

U.S. PATENT DOCUMENTS

| | | | |
|---|---|---|---|
| 3,901,586 | 8/1975 | Suzuki et al. | 355/55 |
| 4,322,159 | 3/1982 | Takahashi et al. | 355/57 |
| 4,416,535 | 11/1983 | Tottori | 355/55 |
| 4,521,100 | 6/1985 | Yonemori et al. | 355/57 |

*Primary Examiner*—Monroe H. Hayes
*Attorney, Agent, or Firm*—Burns, Doane, Swecker & Mathis

[57] ABSTRACT

Improvements in a magnification varying device for electrophotographic copying machine of the mirror scan type to eliminate the drawbacks to be encountered and resulting in degraded copy images when the magnification varying range is increased, such as objectionable operative connection between a projection lens and a deflection mirror, and leakage of undesired light between the lens and a light blocking member around the path of travel of the lens. The present device includes an eccentric cam having the largest radius at a position for giving an equal magnification to assure smooth transmission of drive force to the deflection mirror, and a second light blocking member provided at each side of the lens and opposed to the mirror for preventing the objectionable light not blocked by the above blocking member from reaching the mirror when the lens is qat a position for a reduced magnification.

15 Claims, 8 Drawing Sheets

MAGNIFICATION VARYING DEVICE FOR ELECTRO-PHOTOGRAPHIC COPYING MACHINE

BACKGROUND OF THE INVENTION

The present invention relates to a magnification varying device for electrophotographic copying machines of the mirror scan type wherein a projection lens for converging a bundle of rays from the surface of an original is moved along the optical axis, and a deflection mirror for reflecting the bundle of rays through the projection lens toward a photoconductive drum is moved for the correction of the optical path length to give the desired altered magnification.

U.S. Pat. No. 4,571,064 (patented on Feb. 18, 1986) discloses a known device of this type.

FIG. 1 shows the basic construction of copying machines having such a magnification varying device. During copying operation, a light source a and a first movable mirror b move leftward in the drawing at a speed v/n (wherein v is the circumferential speed of a photoconductive drum c, and n is the magnification of copy to be obtained) to scan an original on a document table d. With this movement, a second movable mirror e and a third movable mirror f similarly move leftward at a speed of v/2n. In accordance with a variation in magnification, on the other hand, a projection lens g is shifted along its optical axis, and a deflection mirror h is also shifted with the lens g along the optical axis for the correction of the length of optical path, whereby the projection system is made ready to give the desired magnification.

At a magnification of 1.0× (equal magnification) or a reduced magnification, the light source a scans the entire copying range of the document table d, and the third movable mirror f advances with this movement to a position indicated at ms. When giving an enlarged magnification, the light source a does not scan the entire copying range of the table d, so that the most advanced position of the third movable mirror f which moves with the light source is before the position ms. At the largest magnification, for example, the advanced position is l0 as shown in FIG. 1.

The projection lens g is positioned at l1 for the largest magnification, at m1 for a magnification of 1.0× or at s1 for the smallest reduced magnification.

The deflection mirror h is positioned at l2 for the most enlarged magnification, at m2 for a magnification of 1.0× or at s2 for the most reduced magnification.

FIG. 2 shows a mechanism for shifting the projection lens g and shifting the mirror h therewith. A stepping motor i, when rotated, moves a wire j to shift the projection lens g along its optical axis, while driving an eccentric cam k to shift the mirror h which has a cam follower p in pressing contact with the cam k. Indicated at q in FIG. 2 is a tension spring for pressing the cam follower p into contact with the eccentric cam k.

With this conventional arrangement, the eccentric cam k has a cam curve of great inclination as shown in FIG. 3 and also a large radius when the range of varying magnification is, for example, as great as 0.5× to 2.0×. Now, suppose the transmission torque of the eccentric cam shaft is T, and the component of the transmitted force N in the direction of the optical axis is Nx when the cam follower p is in contact with the cam k at the position where the inclination of the cam curve is greatest (e.g. at the position of 0.5×). The component Nx is then given by $Nx=T/R\times\cos\theta$ wherein R is the radius of the cam, and $\theta$ is the inclination of the cam curve. Thus, the component Nx is small as shown in FIG. 3, and the force for propelling the mirror h is small, with the resulting likelihood that the stepping motor i will not operate properly owing to an excessive torque.

Furthermore, the component Ny perpendicular to the optical axis increases in corresponding relation to the decrease of the component Nx, exerting an objectionable force on the mirror h to make the mirror h difficult to move smoothly, subjecting the stepping motor i to a still increased load and distorting or vibrating the mirror h. The improper operating condition of the motor and these objections impair the quality of copies to be obtained.

As seen in FIG. 4, the projection optical system is also provided with light blocking means for regulating the light from the scanning means so that only the light substantially passing through the projection lens g reaches the mirror h, preventing the incidence of the other light. The blocking means comprises a wall r provided around the path of travel of the projection lens g for blocking the objectionable light, and light blocking members t and u provided at the front and rear ends of the projection lens 9 for blocking light at the clearance between the lens g and the blocking wall r.

Such light blocking means is effective when the magnification is to be varied over the range of from about 0.64× to about 1.42×. However, if the magnification varying range is as wide as from 0.5× to 2.0×, the projection lens g needs to be moved an increased amount through an optical path of increased width. This entails the necessity of increasing the width W of the opening in the light blocking wall r or of decreasing the axial length V of the wall r. The increase in the width W diminishes the space for accommodating the mechanism for driving the lens g and the mirror h and is not advantageous, further necessitating larger elastic blocking members t and u to result in an increased drive load. Accordingly, the axial length V of the light blocking wall r is reduced as seen in FIG. 4.

When the blocking wall r is thus formed, the projection lens g is brought to a position s1 shown in FIG. 4 at the most reduced magnification, creating a large clearance A between the lens g and the wall r. Consequently, objectionable light traveling from the light toward the left in the drawing leaks from the clearance A and impinges ont he mirror h.

To close the clearance A, it appears useful to enlarge the elastic blocking member u at the rear end of the lens g and cause the member u to extend toward the third movable mirror f. Nevertheless, at a magnification of 1.0×, the most advanced position ms of the third movable mirror f is most proximate to the position ml of the lens g (see FIG. 1), permitting the enlarged blocking member u to interfere with the mirror f. The enlarged blocking member u is therefore not usable.

SUMMARY OF THE INVENTION

A first object of the present invention is to provide a magnification varying device for use in electrophotographic copying machines for giving an altered magnification by shifting a projection lens and a deflection mirror for directing projected light toward a photoconductive member without entailing the problem that objectionable power transmission at a greatly inclined portion of an eccentric cam operatively connecting the projection lens to the deflection mirror impairs the quality of copy images to be obtained, even when the magnification varying range is great.

A second object of the present invention is to provide a magnification varying device of the type stated above wherein the eccentric cam has an improved configuration to readily overcome the above problem involved in the operative connection between the projection lens and the deflection mirror.

A third object of the present invention is to provide a magnification varying device of the type stated above wherein the eccentric cam has a reduced size and is provided with a cam follower which is connected to the deflection mirror by a pivotal arm-link mechanism so as to overcome the foregoing problem involved in the operative connection between the projection lens and the deflection mirror.

A fourth object of the present invention is to provide a magnification varying device of the type stated above wherein the cam follower of the eccentric cam is connected to the deflection mirror by a single arm to overcome the foregoing problem involved in the operative connection between the projection lens and the deflection mirror by a simplified mechanism.

A fifth object of the present invention is to provide a magnification varying device of the type stated above wherein the cam follower coupled to the deflection mirror is adapted to follow the movement of the eccentric cam by means provided for biasing the deflection mirror away from the eccentric cam, so that the biasing force allowing the following movement is minimized at the positions of minimum and maximum magnifications where the operative connection between the projection lens and the deflection mirror by the eccentric cam involves increased transmission resistance, so as to overcome the foregoing problem with greater reliability.

A sixth object of the present invention is to provide a magnification varying device of the type stated above for giving an altered magnification by shifting the projection lens and the deflection mirror, the device being free of the likelihood that even when the magnification is altered greatly, the quality of copy images to be obtained will not be impaired by the incidence of objectionable light on the deflection mirror through a clearance between the projection lens and a light blocking member provided around the path of travel of the lens.

A seventh object of the present invention is to provide a magnification varying device of the type described above wherein the projection lens is provided at each side thereof with a second light blocking member opposed to the deflection mirror by which member the objectionable light not blocked by the first-mentioned blocking member when the projection lens is positioned for a reduced magnification can be prevented from reaching the deflection mirror, the second blocking member being in the form of an elastic member having an outwardly extending forward end, whereby the degradation of copy images due to the objectionable light can be obviated without entailing the problem of interference between optical elements.

Other objects and features of the present invention will become apparent from the following description with reference to the accompanying drawings.

DETAILED DESCRIPTION OF THE INVENTION

Embodiments of the present invention will be described below with reference to the drawings.

Figure 5:
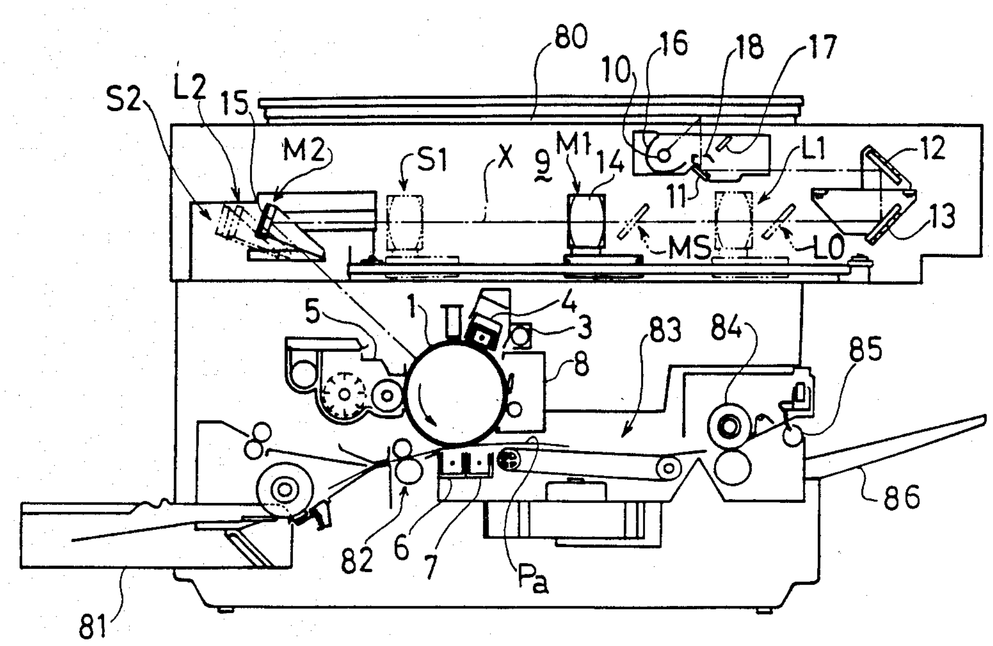
FIG. 5 is a side elevation schematically showing the interior construction of an electrophotographic copying machine incorporating a magnification varying device of the present invention.

FIG. 5 shows an electrophotographic copying machine including a magnification varying device embodying the invention. A photoconductive drum 1 drivingly rotatable counterclockwise is disposed approximately in the center of the machine main body. Arranged around the drum 1 are an eraser lamp 3, sensitizing charger 4, developing unit 5 of the microtoning type, transfer charger 6, charger 7 for separating copy paper off and a cleaner 8 of the blade type. After passing by the eraser lamp 3 and the sensitizing charger 4, the uniformly charged surface of the drum 1 is exposed to an optical image from an optical system 9.

The optical system 9, which is disposed under a document table 80 for scanning originals, comprises an illuminating lamp 10 serving as a light source, reflecting mirror 16, sub-reflecting mirror 17, slitted member 18, first movable mirror 11, second movable mirror 12, third movable mirror 13, lens 14 serving as a projection lens and deflection mirror 15 for directing the projected light toward the drum 1. While the photoconductive drum 1 rotates at a circumferential speed of v (which is constant irrespective of magnification), the light source 10 and the first movable mirror 11 travel leftward at a speed of v/n (wherein n is a magnification). The second movable mirror 12 and the third movable mirror 13 travel leftward at a speed of v/2n. While the lens 14 is shifted along the optical axis and the deflection mirror 15 is shifted and pivotally moved for giving an altered magnification, the magnification varying device will be described later in detail.

Copy paper Pa is stacked and held in a cassette 81. A sheet of paper Pa is fed to the drum 1 by a registering roller 82 in suitably timed relation with the image on the drum. After the image is transferred to the paper, the paper is transported through a path 83, passed over a fixing roller 84 and then delivered onto a tray 86 by a discharge roller 85.

The magnification varying device will be described next with reference to FIGS. 6 and 7. By this device, a magnification is selectable from among steplessly varying magnifications from an enlarged scale to a reduced scale. More specifically, the magnification range is from the most enlarged magnification (2.0×) to the most reduced magnification (0.5×) through the magnification of 1.0×.

The magnification varying device generally comprises a lens shifting mechanism 30, a mirror shifting mechanism 40, a mechanism 70 for pivotally moving the mirror 15, a stepping motor (drive source) 20 for driving these mechanisms, and a torque transmission mechanism for the motor 20.

A drive gear 21 fixed to the output shaft of the stepping motor 20 is in mesh with a first intermediate gear 22. The gear 22 is mounted on a pulley shaft 29 fixedly carrying a drive pulley 31 and a second intermediate gear 23. The gear 23 is in mesh with a third intermediate gear 24 which is fixed to the same shaft (cam shaft) 28 as an eccentric cam 41 for continuously moving the mirror 15.

Accordingly, the drive force of the stepping motor 20 is delivered to the drive pulley 31 of the lens shifting mechanism 30 via the drive gear 21 and the first intermediate gear 22, while the force is also delivered to the eccentric cam 41 of the mirror shifting mechanism 40 via the drive gear 21, first intermediate gear 22, second intermediate gear 23 and third intermediate gear 24.

The lens shifting mechanism 30 has the following construction. The through lens 14 is supported on a lens mount 90, which is movably mounted on a guide shaft 32 and a guide rail 33 (shown only in FIG. 7) in parallel with the optical axis X. A wire 34 wound around the drive pulley 31 is reeved around rotatable pulleys 35, 36 and is attached at an intermediate portion thereof to a side portion of the lens mount 90.

Figure 4:
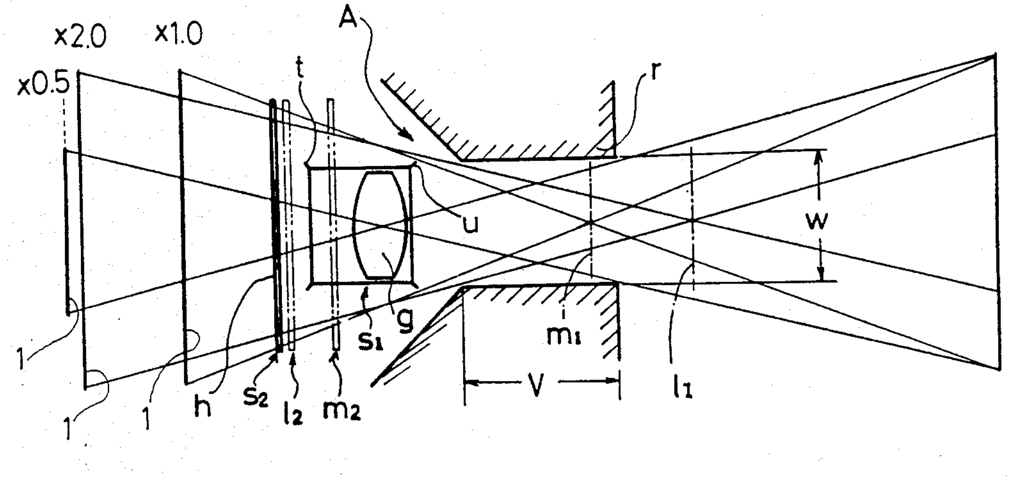
Fig. 4 PRIOR ART
FIG. 4 is a plan view in development showing the projection optical system of the conventional device to illustrate an arrangement for blocking light between the projection lens and a light blocking member around the path of travel of the lens.
Figure 9:
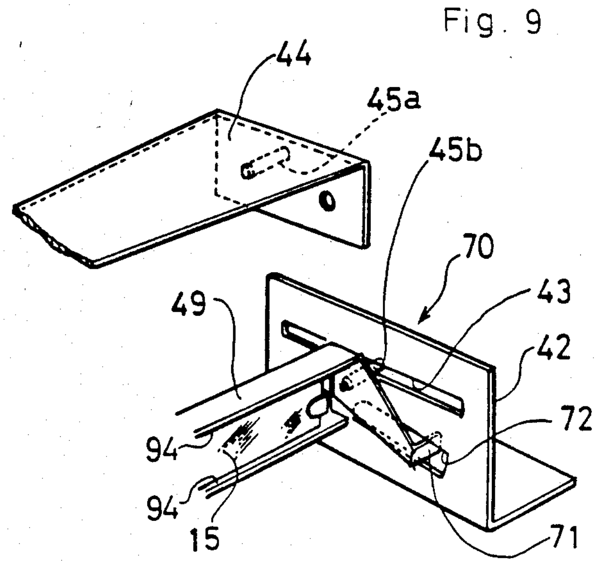
FIG. 9 is a fragmentary perspective view partly exploded and showing a structure for supporting the deflection mirror of the device shown in FIGS. 6 and 7.

The lens 14 is covered along its side periphery with a lens cover 91. A fixed cover 92 is provided outside the lens cover 91 along the path of travel of the lens 14. The lens cover 91 and the fixed cover 92 block objectionable light. However, as already described in BACKGROUND OF THE INVENTION, the configuration of the fixed cover 92 is limited, such that a clearance A (see FIG. 4) along the optical axis occurs between the lens cover 91 and the fixed cover 92. The lens cover 91 is provided, at one end thereof opposed to the mirror 15, with a pair of elastic light blocking members 93, 93 extending toward the mirror 15 and each curved outward toward its forward end. It is suitable to use a polyester film (which is typically Mylar, trademark of E. I. du Point de Nemours & Co.) for the elastic light blocking members 93. The light blocking member 93 is so dimensioned as to come into pressing contact with the mirror 15 at a position of reduced magnification (see FIG. 12). If brought into direct pressing contact with the surface of the mirror 15, the blocking member 93 is likely to deface the mirror surface. Accordingly, it is suitable that the blocking member 93 be adapted to come into pressing contact with an edge 94 of the mirror holder 49 to be described below (see FIG. 9).

The mirror shifting mechanism 40 has the following construction. A support plate 42 fastened to the machine main body is formed with a guide aperture 43 in parallel with the optical axis. Guide pins 45*a*, 45*b* respectively projecting from one side of a mirror cover 44 and one end of the mirror holder 49 are inserted into the guide aperture 43 for guiding the movement of the mirror 15 along the optical axis X. The two guide pins 45*a*, 45*b* are interconnected at their outer ends by a connecting plate 46. As seen in FIG. 7, an elastic holder 48 carrying a roller 47 at its forward end is attached to the inner surface of the connecting plate 46. The holder 48 elastically presses the roller 47 against the support plate 42 to hold the side face of the mirror cover 44 in intimate contact with the support plate 42 and to hold the end face of the mirror holder 49 in intimate contact with the side wall inner surface of the mirror cover 44, whereby the mirror 14 is positioned properly at right angles with the optical axis X. The other end of the mirror holder 49 has a guide pin 50 which is guided and supported by a guide plate 51 attached to the main body.

The mirror 15 is shifted along the optical axis X by the rotation of the eccentric cam 41 through an angle of less than 360 degrees. For this purpose, a pivotal arm 52 is movably supported at its one end by a pivot 53 and provided at an intermediate portion thereof with a cam follower 54 in contact with the eccentric cam 41. The pivotal arm 52 has a free end 55 which is connected to one end of a link 57 by a pin 56. The other end of the link 57 is attached by a pin 58 to an adjusting plate 59 which is fixed to the connecting plate 46 and is adjustable in its fixed position.

The connecting plate 46 is biased by a tension spring 60 toward the direction of propagation of a bundle of rays through the lens 14. Consequently, the mirror 15 is biased toward the same direction at all times, with the pivotal arm 52 also biased in the same direction, holding the cam follower 54 in pressing contact with the cam face of the eccentric cam 41. The eccentric cam 41 is positioned at the same side as the mirror 15 with respect to the pivotal arm 52.

Figure 1:
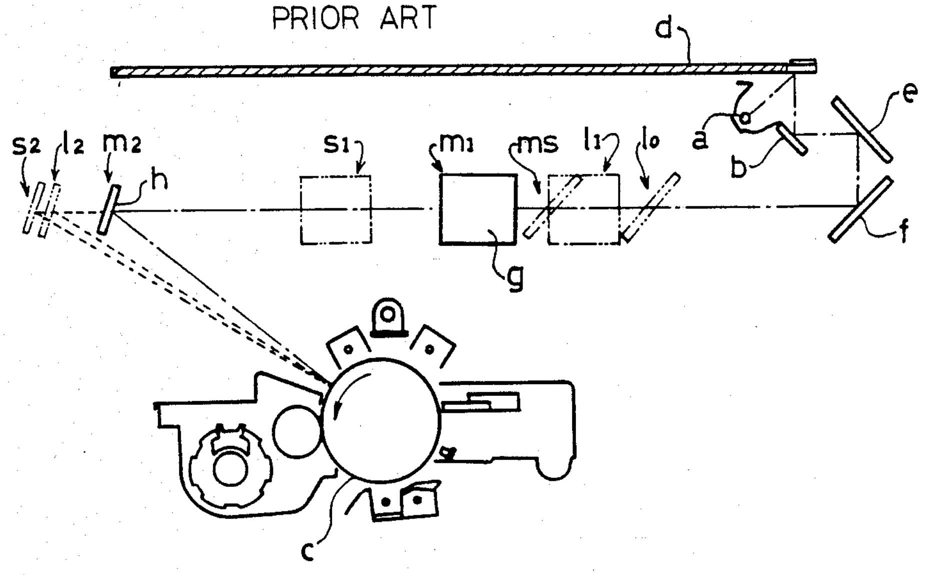
Fig. 1 PRIOR ART
FIG. 1 is a side elevation schematically showing a known magnification varying device in an electrophotographic copying machine of the mirror scan type.
Figure 2:
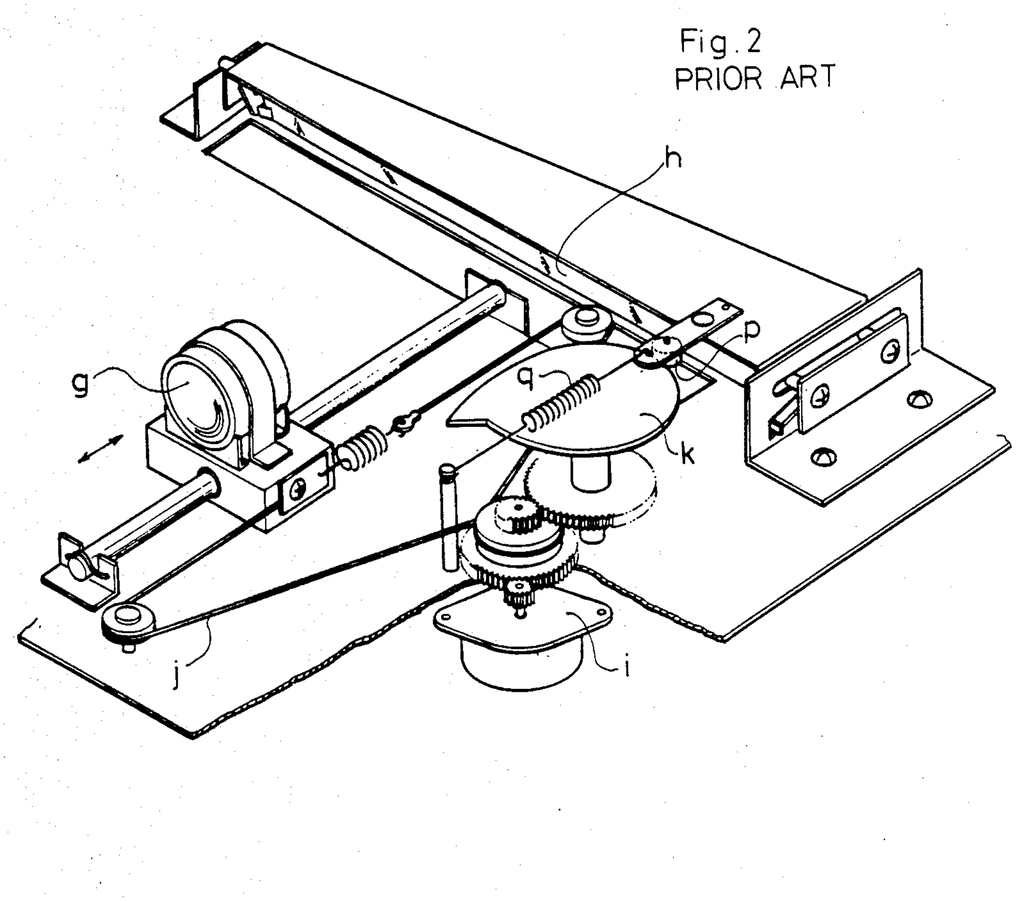
Fig. 2 PRIOR ART
FIG. 2 is a perspective view showing a mechanism included in the conventional device for shifting a projection lens and a mirror.
Figure 3:
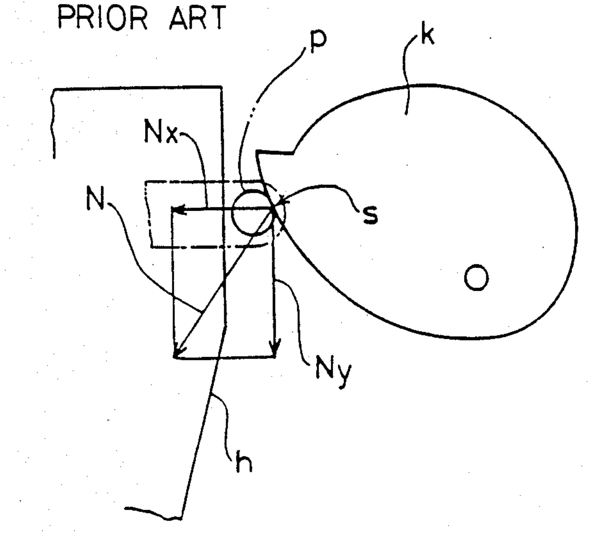
Fig. 3 PRIOR ART
FIG. 3 is a plan view showing the action of the force transmitted by an eccentric cam included in the conventional device for shifting the mirror with the projection lens.
Figure 8:
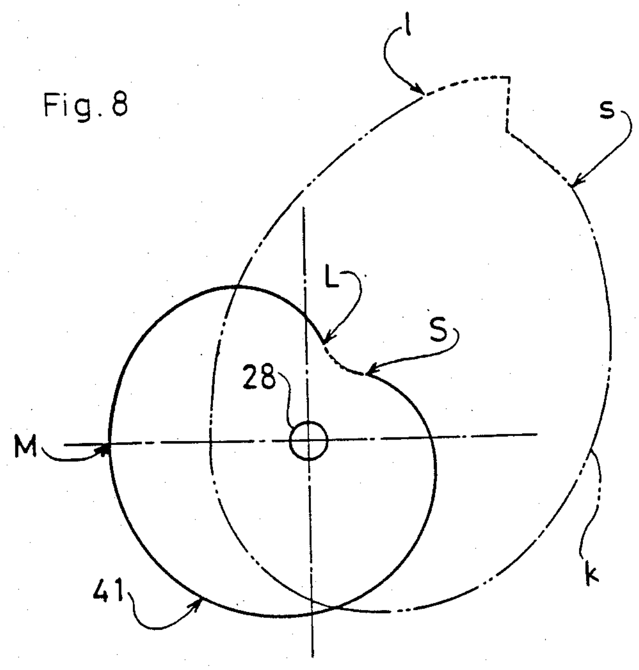
FIG. 8 is a plan view showing the difference in configuration between the eccentric cam used in the conventional device of FIGS. 1 and 2 and the eccentric cam included in the device of the invention shown in FIGS. 6 and 7.

The cam curve of the eccentric cam 41 is shown in FIG. 8. The cam radius is largest at a position M for the magnification of 1.0× and is small at a position L for the most enlarged magnification (2.0×) and also at a position S for the most reduced magnification (0.5×). As compared with the conventional eccentric cam k (see FIG. 3) indicated in a phantom line in FIG. 8, the cam 41 of the present embodiment is apparently greatly reduced in size. The inclination of cam angle at the positions L and S is apparently smaller than that at the corresponding positions l and s of the conventional cam k.

Figure 13:
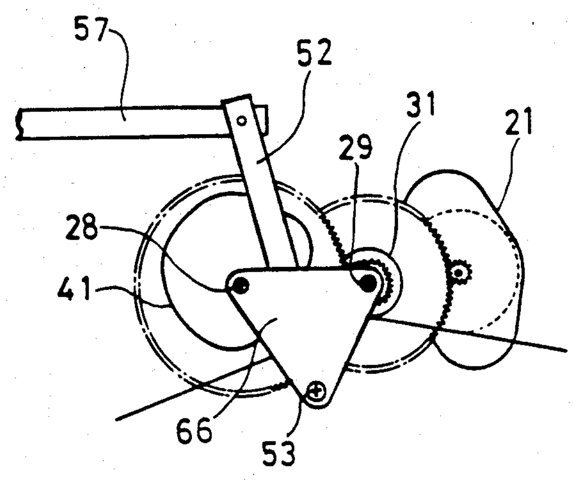
FIG. 13 is a plan view showing another embodiment of drive assembly of the invention for the projection lens and the deflection mirror.

The pivotal arm 52 has an extension 61 which is inserted through a slot 63 in a frame side wall 62 and is thereby guided and supported. The pivotal arm 52 and the link 57 are therefore smoothly movable. Alternatively as seen in FIG. 13, the cam shaft 28, the pulley shaft 29 and the pivot 53 are connected together and supported by a reinforcing plate 66 and can therefore be supported with improved strength and enhanced stability.

The mechanism 70 for pivotally moving the mirror 15 will be described next. The end shown in FIG. 9 of the mirror blade 49 is vertical and planar and has a bent portion 71 which is engaged in an inclined guide aperture 72 formed in the support plate 42, whereby the mirror holder 49 is made pivotally movable about the guide pins 45*b*, 50 when the holder is shifted. When the inclined guide aperture 72 is suitably shaped, the bundle of rays reflected from the mirror 15 can be made incident on the photoconductive drum 1 at a definite position wherever the mirror 15 may be positioned for the desired magnification.

The operation of the magnification varying device of the above construction will be described below.

When desired magnification data is given, for example, from the operation panel of the machine, a predetermined number of pulses according to the data are supplied to the stepping motor 20 to rotate the motor 20 a specified amount. With the predetermined pulse number, the 1.0× position of the lens 14 is photoelectrically detected, and the motor 20 is rotated forward or reversely from the 1.0× position to the position of the desired magnification by the number.

The rotation of the stepping motor 20 is transmitted via the drive gear 21, first intermediate gear 22, drive pulley 31 and wire 34 to the lens 14 to shift the lens 14. the position of the lens 14 is indicated in FIG. 5 by L1 for the most enlarged magnification, by M1 for 1.0× or by S1 for the most reduced magnification.

The rotation of the first intermidiate gear 22 is also transmitted via the second intermediate gear 23 and the third intermediate gear 24 to the eccentric cam 41, which in turn causes the cam follower 54 to move the pivotal arm 52, further moving the link 57 and the mirror holder 49 associated therewith to position the mirror 15 in conformity with the desired magnification. FIG. 5 indicates the position of the mirror 15 by L2 for the most enlarged magnification, by M2 for 1.0×, or by S2 for the most reduced magnification.

Further by virtue of the shift of the mirror holder 49 itself, the holder is pivotally moved by being guided by the inclined guide aperture 72 formed in the support plate 42 to set the mirror 15 in a specified pivotally moved position. This makes it possible for a bundle of rays reflected at the mirror 15 to be incident on the photoconductive drum 1 at a definite position irrespective of the magnifications.

Since the displacement of the eccentric cam 41 is enlarged by the pivotal arm 52 and then delivered to the link 57 and the mirror 15, the cam 41 can be small-sized as seen in FIG. 8, and the cam angle can be smaller at the positions L and S. Accordingly, the component Fy, perpendicular to the optical axis, of the transmitted force F at the position S can be much smaller than in the prior art as seen in FIG. 7. Furthermore, the rotational moment produced by the component Fy can be released through the link 57, preventing the mirror 15 from twisting. Consequently, the component Fx along the optical axis of the transmitted force acts effectively on the mirror 15, smoothly shifting the mirror 15 while protecting the drive source (stepping motor) 20 from an excessive torque. Furthermore, the causes that would lead to the distortion of the mirror can be eliminated.

Further according to the present embodiment, the cam follower 54 on the pivotal arm 52 is pressed into contact with the eccentric cam 41 at one side thereof opposite to the other side opposed to the mirror 15, by the tension spring 60 biasing the mirror 15 toward the direction of propagation of the light. This makes it possible to use the eccentric cam 41 which has a small radius at the most reduced magnification position S and the most enlarged magnification position L, to minimize the biasing force of the spring 60 at these positions S and L, and consequently to lessen the load on the drive source 20 for rotating the eccentric cam 41. Because the load can be thus mitigated at the positions S and L and also because the small-sized cam 41 and the link are used, the drive source 20 can be of a reduced torque.

Aside from the arrangement of the above embodiment, the cam follower 54 on the pivotal arm 52 can be held in pressing contact with the eccentric cam 41 by a spring for biasing the mirror 15 in a direction opposite to the direction of propagation of the bundle of rays.

As seen in FIG. 5, the third movable mirror 13 can be advanced to a position MS when the projection system gives a magnification of 1.0× and a reduced magnification, and to a position L0 at the most enlarged magnification.

Figure 10:
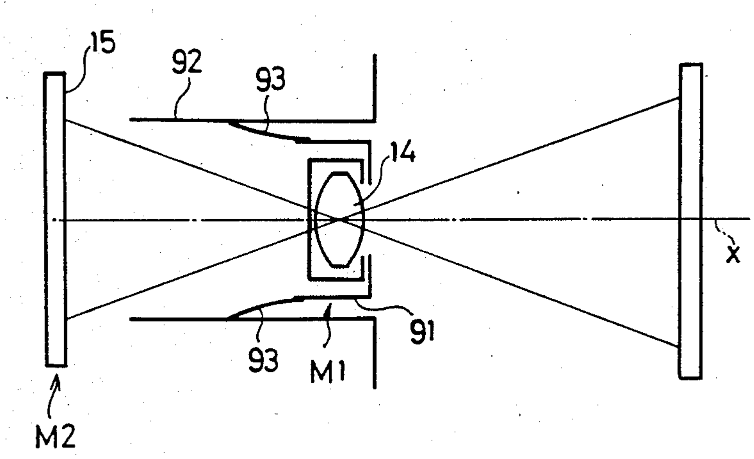
FIGS. 10, 11 and 12 are plan views in development of the projection optical system of the device of the invention shown in FIGS. 6 and 7 to illustrate how light is blocked around the projection lens when giving a magnification of 1.0×, an enlarged magnification and a reduced magnification, respectively.

With reference to FIG. 10, when the lens 14 is at the 1.0× position M1, the elastic light blocking members 93, 93 on the lens cover 91 at the end thereof toward the mirror 15 are in pressing contact with the inner surface of the fixed cover 92 to clock objectionable light, preventing this light from impinging on the mirror 15.

Figure 11:
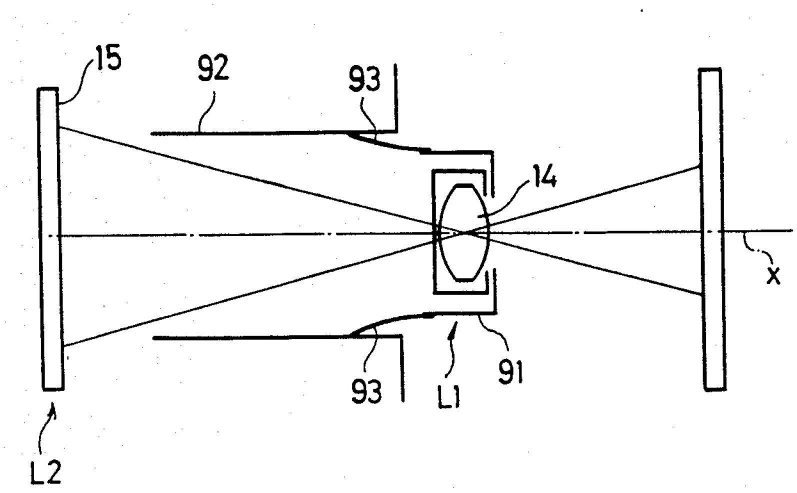

Also when the lens 14 is at the most enlarged magnification position L1 as seen in FIG. 11, the light blocking members 93, 93 are in pressing contact with the inner surface of the fixed cover 92 to prevent objectionable light from impinging on the mirror 15.

Figure 12:
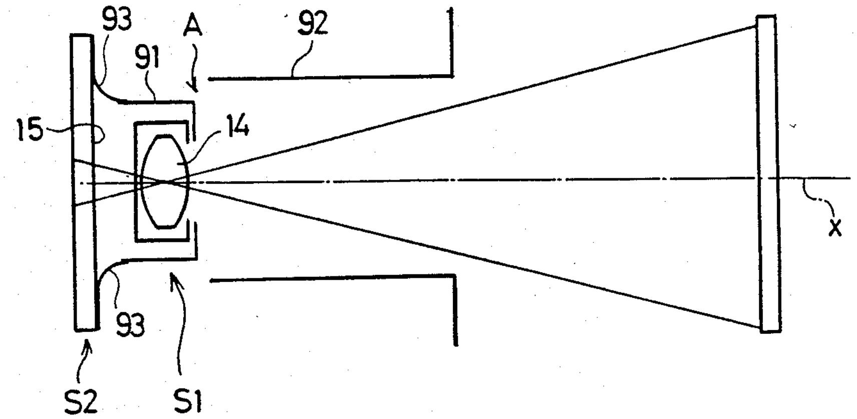

When the lens 14 is in the most reduced magnification position as shown in FIG. 12, a clearance A in the direction of the optical axis X occurs between the lens cover 91 and the fixed cover 92, whereas the elastic light blocking members 93, 93 are then in pressing contact with the mirror 15 to cover the mirror 15, with the result that the objectionable light leaking from the clearance A can be prevented from impinging on the mirror 15. FIG. 12 shows the lens 14 at the most reduced magnification position S1, but even when the lens is at the position for a reduced magnification closer to 1.0×, the blocking members 93, 93 are in pressing contact with the mirror 15 to prevent the incidence of the objectionable light through the clearance A on the mirror 15.

Figure 6:
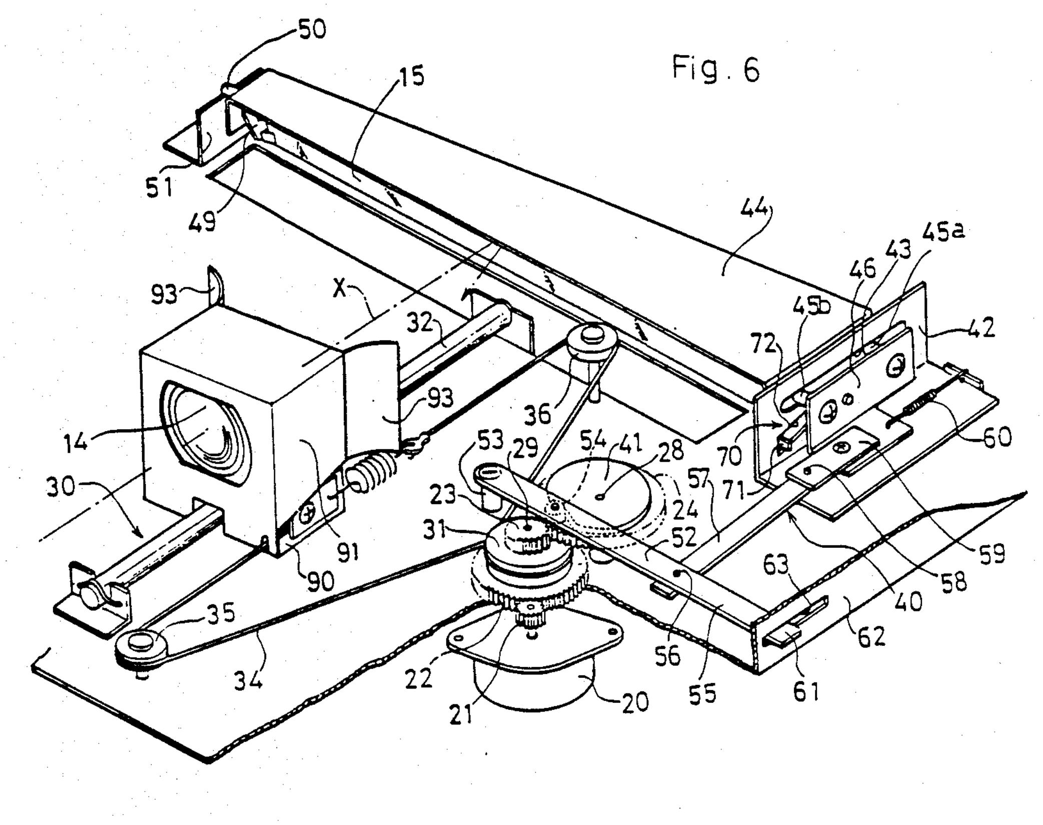
FIG. 6 is a perspective view showing the most preferred embodiment of magnification varying device of the invention.
Figure 7:
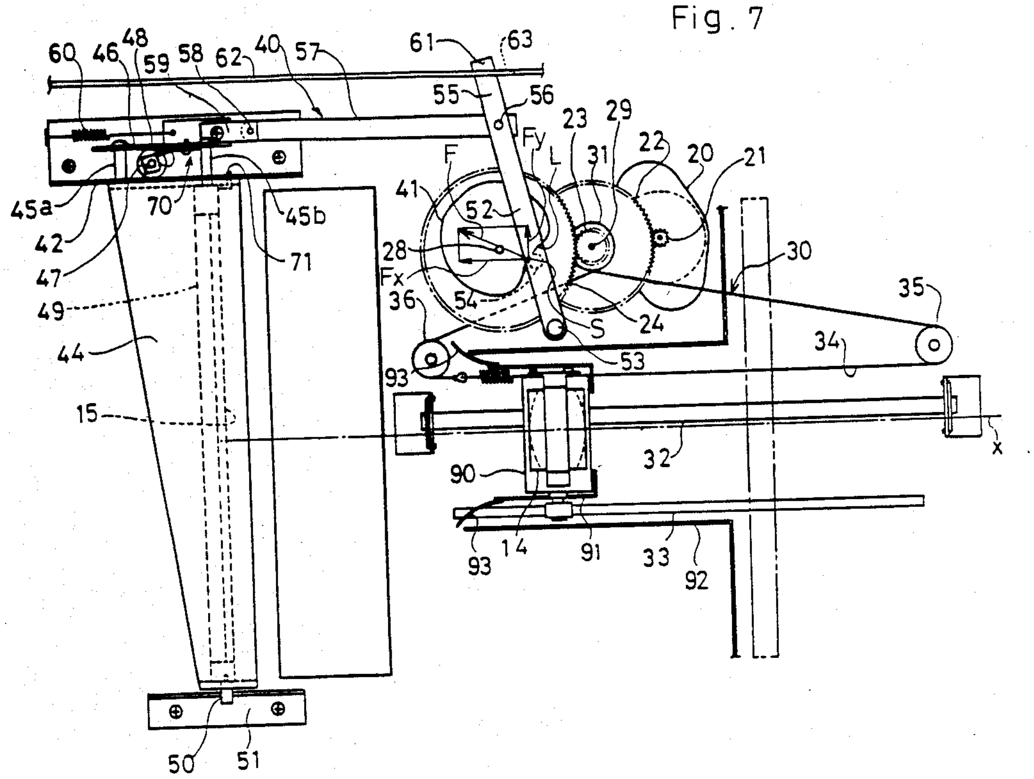
FIG. 7 is a plan view of FIG. 6 to show how a force is transmitted from an eccentric cam to a mirror.

According to the present embodiment, the mirror 15 moves the largest amount when brought to the most reduced magnification position S2 as shown in FIG. 5, and the tension spring 60 biasing the mirror 15 in the direction of propagation of the bundle of rays then exhibits a minimum force as seen in FIGS. 6 and 7. Consequently, when the mirror 15 is around the position S2, the force for driving the mirror tends to be insufficient, whereas the force of pressing contact of the elastic blocking members 93, 93 is added to the spring force according to the embodiment, making the mirror 15 smoothly shiftable.

In addition to the foregoing embodiment, the present invention can be embodied variously. Although the magnification varying device of the invention described has enlarging and reducing functions to afford a variable magnification over a wide range of from 0.5× to 2.0×, the present invention can be embodied as a magnification varying device having a reducing function only over a magnification varying range, for example, of from 0.5× to 1.0× to provide a wide range of reductions.

Figure 14:
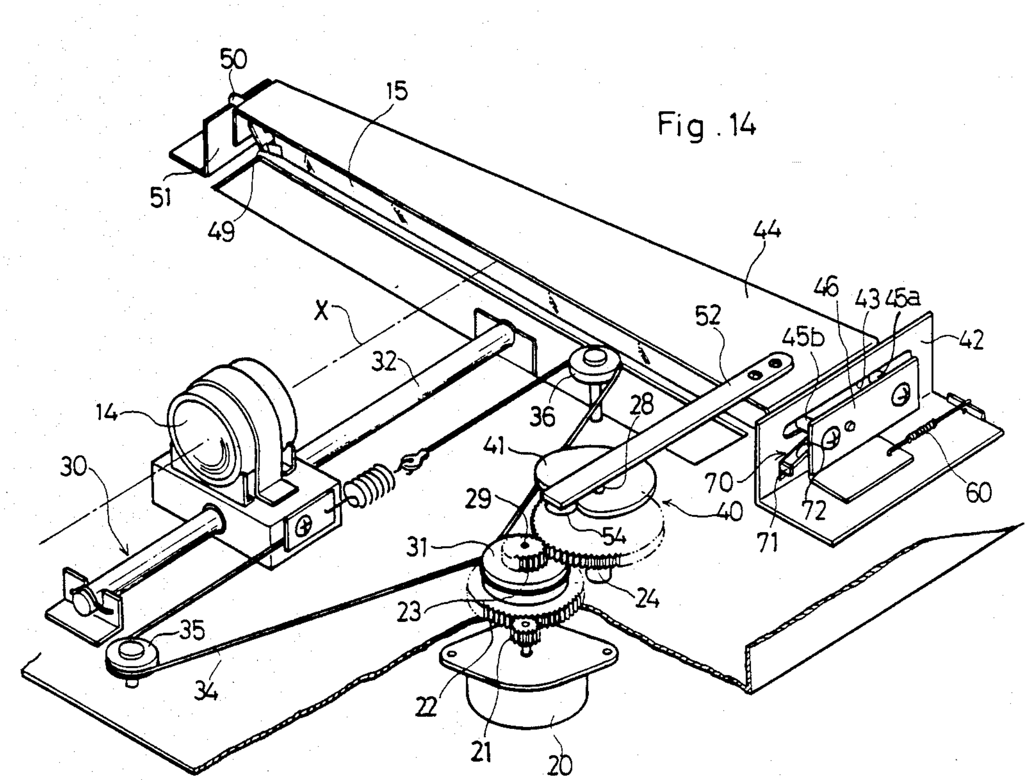
FIG. 14 is a perspective view showing another magnification varying device embodying the invention.
Figure 15:
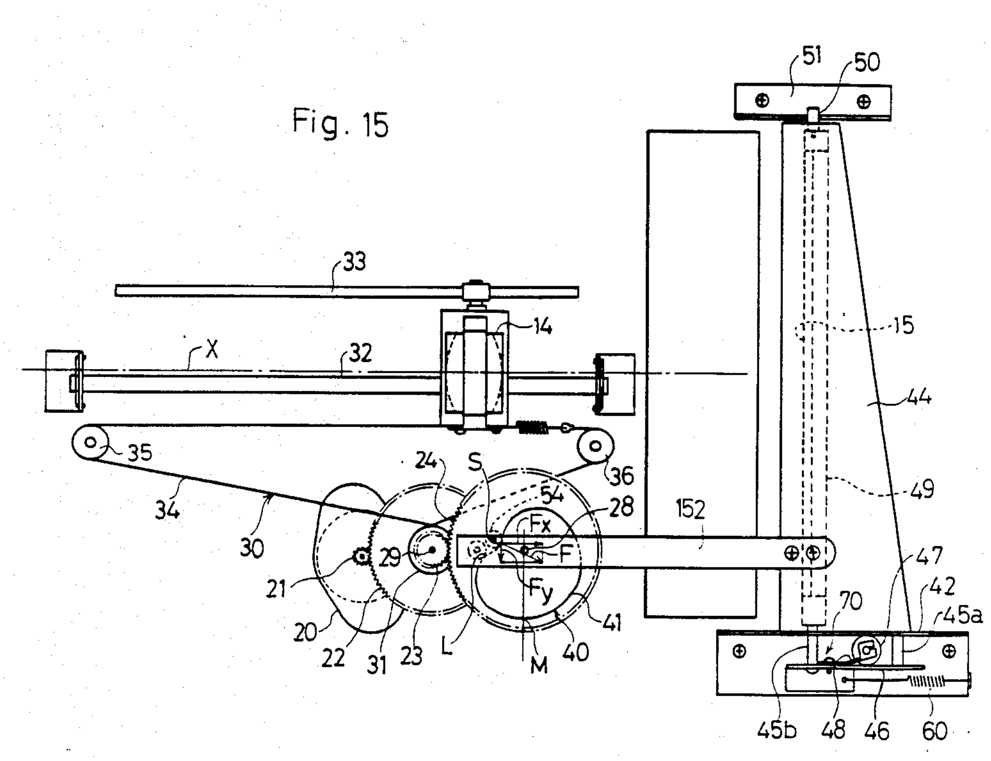
FIG. 15 is a plan view of FIG. 14.

FIGS. 14 and 15 show another magnification varying device embodying the present invention, which is simplified in the connection between the eccentric cam and the mirror. Throughout FIGS. 6, 7, 14 and 15, like parts are designated by like reference numerals, and the different feature only will be described.

As will be apparent from the drawings, the mirror cover 44 has attached thereto a single arm 152 extending along the optical axis X and carrying a cam follower 54 at its free end. The cam follower 54 is held in pressing contact with the eccentric cam 41 at one side thereof opposite to the other side closer to the mirror 15, by a tension spring 60 acting in the direction of propagation of the bundle of rays on a connecting plate 46 which is connected to the mirror cover 44.

With this embodiment, the cam follower 54 is connected to the mirror 15 by the single arm 152, i.e. by a simple means. This embodiment operates in the same manner as the embodiment of FIGS. 6 and 7 with the same advantages except that the first embodiment has the advantage afforded by the lever-link mechanism.

What is claimed is:

1. A magnification varying device for use in an electrophotographic copying machine of the scan type having a projection lens, means for relatively scanning an original with respect to the projection lens and a deflection mirror for deflecting the projected light from the projection lens toward a photoconductive member, the device comprising:

- a drive source,
- lens shifting means coupled to the drive source for shifting the projection means substantially along the optical axis of the lens,
- means for holding the deflection mirror shiftably in the direction of the optical axis of projection, and
- drive force transmission means coupled to the drive source and the deflection mirror for shifting the mirror with the shift of the projection lens, the transmission means including an eccentric cam and a cam follower in contact with the eccentric cam, the eccentric cam having the largest radius at a position where the cam follower is in contact with the cam when giving a magnification of ×1 and shaped to gradually decrease in radius from the largest radius.

2. A device as defined in claim 1 wherein the cam follower is in pressing contact with the eccentric cam at one side thereof opposite to the other side closer to the deflection mirror.

3. A device as defined in claim 1 wherein the drive force transmission means includes a pivotal arm having the cam follower mounted thereon.

4. A device as defined in claim 3 wherein the pivotal arm is positioned at one side of the eccentric cam opposite to the other side thereof closer to the deflection mirror.

5. A device as defined in claim 3 wherein the pivotal arm has an intermediate portion carrying the cam follower and a free end connected to the deflection mirror by a link.

6. A device as defined in claim 1 wherein the mirror holding means comprises a mirror cover coupled to the cam follower and pivotally movably supporting a mirror holding member integral with the deflection mirror by a pin at each end of the holding member; and mirror guide means having a guide portion receiving a pin projecting from a rear portion of one end of the mirror cover and one of the pins of the holding member for guiding straight movement of the mirror cover, and an inclined guide portion receiving a projection extending from the pivoted end of the deflection mirror for pivotally moving the mirror with the straight movement of the mirror cover.

7. A device as defined in claim 6 wherein the mirror guide means has a guide face opposed to the pin projecting end of the mirror cover, and the end of the mirror cover is held in pressing contact with the guide face by a biasing force acting between the guide face and the mirror cover.

8. A device as defined in claim 1 which is from 0.5× to 2.0× in magnification varying range.

9. A magnification varying device for use in an electrophotographic copying machine of the scan type having a projection lens, means for relatively scanning an original with respect to the projection lens and a deflection mirror for deflecting the projected light from the projection lens toward a photoconductive member, the device comprising:

- a drive source,
- lens shifting means coupled to the drive source for shifting the projection lens substantially along the optical axis of the lens,
- an eccentric cam coupled to the drive source and rotatable with the shift of the projection lens,
- means for holding the deflection mirror shiftably in the direction of the optical axis of projection,
- a pivotal arm disposed at one side of the eccentric cam opposite to the other side thereof closer to the deflection mirror, having a pivoted end and provided at an intermediate portion thereof with a cam follower in contact with the eccentric cam, and
- a link member connecting a free end of the pivotal arm to the deflection mirror.

10. A device as defined in claim 9 further comprising means for biasing the deflection mirror away from the eccentric cam.

11. A device as defined in claim 9 wherein the cam is so shaped as to have the largest radius at a position where the cam follower is in contact with the cam when giving a magnification of X1.

12. A device as defined in claim 9 which is from ×0.5 to ×2.0 in magnification varying range.

13. A magnification varying device for use in an electrophotographic copying machine of the scan type having a projection lens, means for relatively scanning an original with respect to the projection lens and a deflection mirror for deflecting the projected light from the projection lens toward a photoconductive member, the device comprising:

- means for holding the projection lens shiftably substantially along the optical axis of the lens,
- means for holding the deflection mirror shiftably along the optical axis,
- a first light blocking member fixedly provided along the path of travel of the projection lens for regulating the scanning light from the scanning means so that only the portion of the light substantially passing through the projection lens reaches the deflection mirror, and a second light blocking member provided at each side of the projection lens and opposed to the deflection mirror for preventing the light not blocked by the first light blocking means for reaching the deflection mirror when the projection lens is positioned for a reduced magnification, the second light blocking member being in the form of an elastic member having an outwardly extending forward end which is kept in contact with the first blocking member when the projection lens is positioned for equal and enlarged magnification and is brought into pressing contact with the deflection mirror when the projection lens is positioned for the most reduced magnification.

14. A device as defined in claim 13 which is from ×0.5 to ×2.0 in magnification varying range.

15. A magnification varying device for use in an electrophotographic copying machine of the scan type having a projection lens, means for relatively scanning an original with respect to the projection lens and a deflection mirror for deflecting the projected light from the projection lens toward a photoconductive member, the device comprising:

a drive source, lens shifting means coupled to the drive source for shifting the projection lens substantially along the optical axis of the lens, an eccentric cam which is so shaped as to have the largest radius at a position where the cam follower is in contact with the cam when giving a magnification of ×1 and is coupled to the drive source and rotatable with the shift of the projection lens, means for holding the deflection mirror shiftably in the direction of the optical axis of projection, a pitoval arm disposed at one side of the eccentric cam opposite to the other side thereof closer to the deflection mirror, having a pivoted end and provided at an intermediate portion thereof with a cam follower in contact with the eccentric cam, and a link member connecting a free end of the pivotal arm to the deflection mirror.

* * * * *